United States Patent [19]

Bradley

[11] Patent Number: 4,670,281

[45] Date of Patent: Jun. 2, 1987

[54] METHOD FOR CONSISTENCY CONTROL OF MANUFACTURED TOMATO PULP

[75] Inventor: Donald B. Bradley, Cinnaminson, N.J.

[73] Assignee: Campbell Soup Company, Camden, N.J.

[21] Appl. No.: 807,119

[22] Filed: Dec. 11, 1985

Related U.S. Application Data

[63] Continuation of Ser. No. 592,260, Mar. 22, 1984, abandoned.

[51] Int. Cl.⁴ .............................................. A23L 1/00
[52] U.S. Cl. .................................... 426/481; 426/489
[58] Field of Search .............. 426/615, 481, 518, 489; 209/235, 268, 270, 273

[56] References Cited

U.S. PATENT DOCUMENTS

| | | | |
|---|---|---|---|
| 1,874,181 | 8/1932 | Gavin | 426/489 |
| 1,978,078 | 6/1933 | Eberts | 426/388 |
| 2,089,071 | 8/1937 | Roberts | 426/489 |
| 2,092,729 | 9/1937 | Eberts | 426/481 |
| 2,890,961 | 6/1959 | Davis | 426/481 |
| 3,172,770 | 3/1965 | Miller | 426/655 |
| 3,346,392 | 10/1967 | Lowe et al. | 426/481 |
| 3,404,065 | 10/1968 | Ingemarsson | 209/270 |
| 3,549,384 | 12/1970 | Walker et al. | 426/615 |
| 4,282,101 | 8/1981 | Takacs et al. | 209/270 |

OTHER PUBLICATIONS

Rotostrainer ®, Hycro ® brochure.
Rotating Drum Screen, Serck Baker Inc. brochure.

*Primary Examiner*—George Yeung
*Attorney, Agent, or Firm*—Banner, Birch, McKie and Beckett

[57] ABSTRACT

This invention provides a method for continuously separating a tomato macerate into a reduced insoluble solids pulp fraction and an insoluble solids-enhanced pulp fraction.

16 Claims, 2 Drawing Figures

METHOD FOR CONSISTENCY CONTROL OF MANUFACTURED TOMATO PULP

This application is a continuation of application Ser. No. 592,260, filed Mar. 22, 1984, now abandoned.

BACKGROUND OF THE INVENTION

1. Field of the Invention

This invention broadly pertains to an improved method for continuously processing freshly harvested tomatoes which facilitates the continuous preparation of a variety of tomato products of uniform quality. In particular, this invention pertains to an improved method for continuously separating a tomato macerate into a reduced insoluble solids pulp fraction with relatively low consistency and an insoluble solids-enhanced pulp fraction with higher consistency.

2. Description of the Prior Art

In the course of producing tomato products such as juice, sauce, soup, ketchup, puree and paste, the tomato fruit, after preliminary washing, sorting and trimming, is macerated (chopped) in conjunction with either a hot break or cold break process. The macerate then is passed through conventional equipment to extract seeds, skin and stem tissue. Subsequent processing of this macerate is dictated by the ultimate product desired.

When preparing tomato products from freshly harvested tomatoes, the quality of the product is influenced greatly by such variables as tomato cultivar, degree of ripeness and degree of freshness. For instance, separate batches of tomato juice prepared from a given quantity of tomatoes which have been obtained from different areas or varieties often exhibit noticeably different consistencies. Unfortunately, a producer has only limited control over these variables. Consequently, to date commercial facilities generally have had to be content with uncontrolled quality changes, such as consistency variations, encountered when preparing tomato products directly from fresh tomatoes.

While the consistency of a tomato product could be adjusted to some extent in appropriate cases by varying the solids content of the processed product, for example, by varying the degree of evaporation of the macerate or possibly by varying the addition of tomato solids in the form of a previously prepared tomato paste to the macerate, such techniques generally are ill-suited for continuous processing, represent a source of added expense which processing tomato products directly from fresh tomatoes is designed to avoid and may not be permitted by applicable statutes.

For example, in the standard commercial procedure for preparing tomato juice from fresh tomatoes no additives except salt are used and evaporative concentration techniques generally are avoided. Consequently, because of the above-noted variables affecting the quality of macerate, producers have had to be content with variations in the quality of tomato products obtained from their processing facilities. Unavoidable quality variations are particularly prevalent in the manufacture of tomato juice.

It is an object of the present invention to provide a method for preparing tomato products, such as juices and concentrates, of uniform and controlled quality.

It is another object of this invention to provide an improved method for continuously and controllably separating a tomato macerate into a reduced insoluble solids pulp fraction with relatively low consistency and an insoluble solids-enchanced pulp fraction with higher consistency.

SUMMARY OF THE INVENTION

These and other objectives which will readily occur to those skilled in the art are achieved by the present invention, which provides a continuous process for partially separating a tomato macerate into a reduced insoluble solids pulp fraction and an insoluble solids-enhanced pulp fraction comprising:

(a) passing said tomato macerate over a filter screen so that a reduced insoluble solids pulp fraction passes through said screen by gravity;

(b) retaining the remaining insoluble solids-enhanced pulp fraction of said macerate on said screen; and (c) separately recovering said reduced insoluble solids pulp fraction and said insoluble solids-enhanced pulp fraction.

In one embodiment of this invention the tomato macerate is passed over a screen having a controllable effective filter area and the effective filter area of said screen is controlled to yield a desired degree of partial separation of said tomato macerate.

In another aspect, the present invention comprises a continuous process useful for preparing a concentrated tomato product of controlled consistency comprising:

(a) macerating tomatoes to break up the tomatoes into a pulpy tomato macerate;

(b) separating a portion of the pulpy tomato macerate by gravity into a reduced insoluble solids pulp fraction and an insoluble solids-enhanced pulp fraction; and (c) blending the insoluble solids-enhanced pulp fraction with the pulpy tomato macerate.

DESCRIPTION OF THE INVENTION

Figure 1:
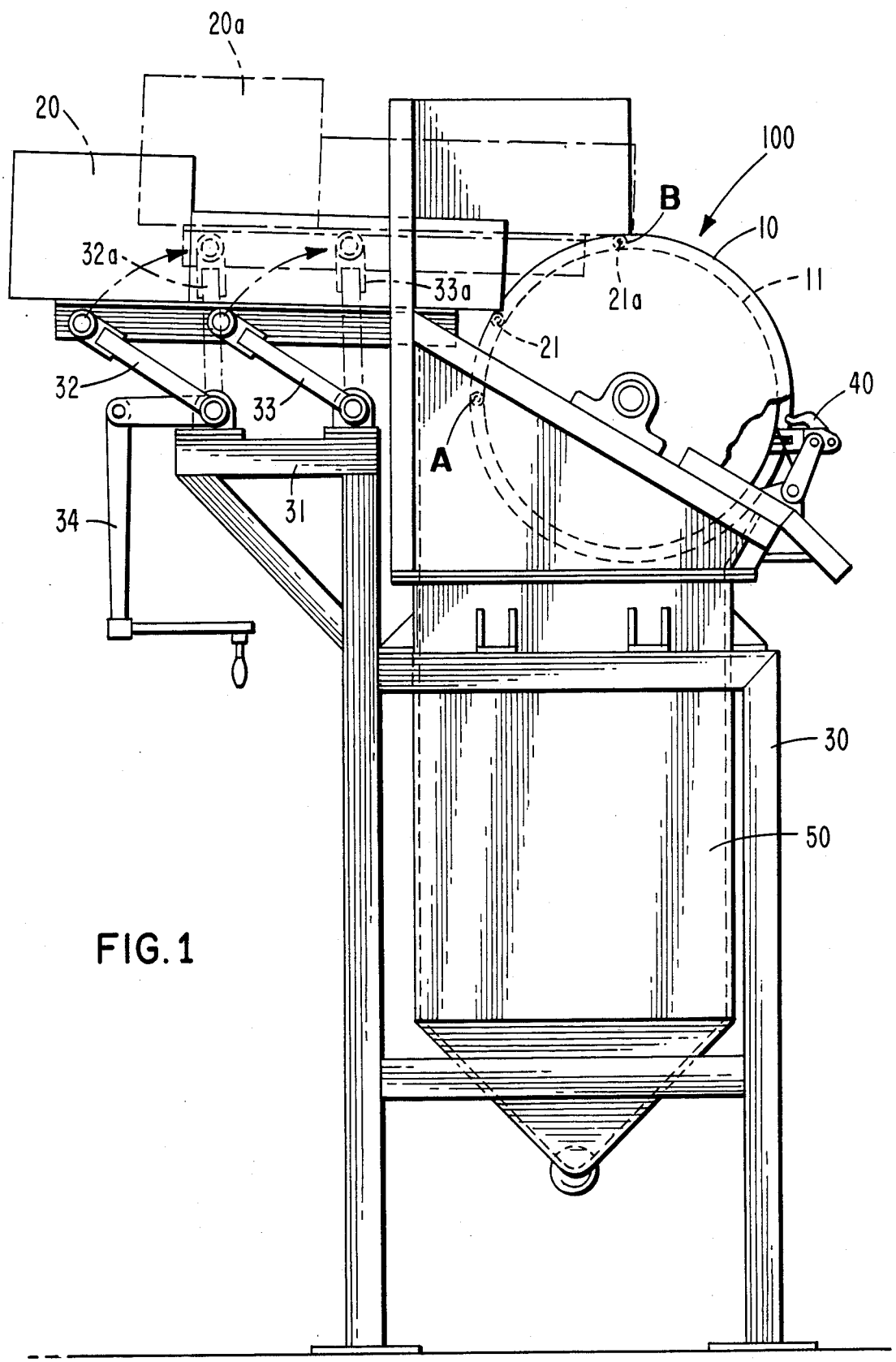
FIG. 1 is a side view of a rotating drum screening apparatus suitable for use in an embodiment of this invention.

The present invention provides an improved method for continuously processing freshly harvested tomatoes. This invention facilitates the continuous preparation of a variety of tomato products of uniform quality. This invention specifically is directed to a method for continuously separating a tomato macerate into a reduced insoluble solids pulp fraction and an insoluble solids-enhanced pulp fraction. In one embodiment, the degree of separation is controlled so as to maintain the uniformity of one of the separated fractions.

As will be described in more detail hereafter, these separate fractions can be used for controlling the quality of tomato products obtained from continuous processing facilities or alternatively these separate fractions can be used for directly manufacturing finished tomato products. Other possible applications for the separate tomato fractions produced in accordance with this invention will readily occur to those skilled in this art, and the present invention is not limited to any specific use.

As employed in the specification and claims, the term 'macerate' and the like denotes application of mechanical action as in breaking up and subdividing (chopping) tomatoes into a pulpy mass containing substantially intact tomato pieces and fragmented tomato solids suspended in its complement of tomato liquid. This term applies as well to the pulpy tomato mass itself.

The present invention uses as its feed material a tomato macerate prepared directly from freshly harvested tomatoes. In preparing the tomato macerate, fresh tomatoes are chopped and then preferably are heated to inactivate enzymes. One may utilize the usual heating and macerating procedures conventionally employed to produce a tomato macerate by the hot-break process. Alternatively, the fresh tomatoes may be macerated initially utilizing the cold-break method.

Those familiar with this technology will recognize that the consistency of macerate initially prepared from fresh tomatoes will be influenced to some extent by the method used to prepare the macerate, e.g., by the choice of the cold-break or hot-break method and other related processing conditions. Chopping the tomatoes to produce intact tomato pieces on the order of about 0.06 to about 1.0 inch (about 0.16 to about 2.5 cm) in size has been found suitable.

In the cold-break method, fresh tomatoes are macerated at about ambient temperatures; while in the hot-break procedure, the same mechanical steps employed in the cold-break process typically are used, but either during maceration or immediately thereafter the tomatoes are heated quickly to a temperature in the range of about 140° to 212° F. (60°-100° C.), so as to inactivate most enzymes responsible for consistency degradation. Preferably the tomatoes are heated quickly to a temperature of at least about 185° F. (85° C.).

Since the macerate obtained from a hot-break process typically has a higher consistency than a macerate prepared using the cold-break procedure, the former process generally is preferred industry-wide. This preference also holds for the present invention.

Once prepared, the macerated tomatoes then are processed through a rotary drum screen to effect the desired separation between a reduced insoluble solids pulp fraction and an insoluble solids-enhanced pulp fraction. Both separated fractions are thereafter processed separately through conventional pulper-finishers to remove skins, seeds, core fragments and other unwanted particulate matter. The separated fractions are now ready for blending with other tomato sources, concentrating, or direct use.

It generally is important that the removal of skins, seeds and core fragments be delayed until after separation of the reduced insoluble solids pulp fraction from the insoluble solids-enhanced pulp fraction. Applicant has discovered that the extent to which this separation can be controlled is influenced strongly by the condition of the tomato macerate fed to the rotary drum filter. For instance, if the macerate is processed through conventional pulper-finisher equipment prior to performing the separation of the desired pulp fractions, the body or character of the tomato macerate oftentimes is unavoidably degraded, i.e., the insoluble solids in the macerate are reduced in size to such an extent that it becomes difficult to control the fraction passing through the screen. With this loss of control, a major purpose of the present invention is obviated. Consequently, in the practice of this convention it is preferred to subject the tomatoes and resulting macerate to only as much mechanical action as is needed to chop the tomatoes initially.

According to the present invention, the tomato macerate is subjected to a partial separation step in which a reduced insoluble solids pulp fraction comprised primarily of the liquid portion of the macerate and some of the smaller fragmented solids is separated from an insoluble solids-enhanced pulp fraction comprised primarily of the intact tomato solids, the larger fragmented tomato solids and a portion of the tomato macerate liquid. This separation is accomplished using gravity alone by passing the tomato macerate over a filter screen. In one embodiment the filter screen has a controllable effective filter area so that the degree of separation can be controlled as desired. A suitable screen generally has slit-type openings in the range of about 0.005 to about 0.06 inches (0.125–1.5 mm) in width (smallest dimension). Preferably, screen openings in the range of about 0.01 to about 0.02 inch (0.25 to 0.51 mm) are used.

Depending upon requirements, the filter area of the screen is fixed so that a reduced insoluble solids pulp fraction containing only so much of the insoluble solids content of the original tomato macerate as desired passes through the screen by gravity. In one embodiment, the effective filter area of the screen is adjustable so that the degree of separation can be controlled as desired. In any event, the insoluble solids content of the separated pulp fraction is reduced as compared with the original macerate. Consequently, the so-separated pulp is free of coarse material and its consistency is also reduced. The remaining insoluble solids-enhanced pulp fraction of the original macerate, having a higher consistency than the reduced insoluble solids pulp is retained on the surface of the screen and is recovered separately from the lower consistency, reduced insoluble solids pulp fraction.

Obviously, by controlling the effective filter area of the screen, the insoluble solids content and consistency of both the reduced and enhanced insoluble solids pulp fractions may be regulated. Consequently, the present invention provides a method for obtaining two distinct streams from a tomato macerate—one a reduced insoluble solids pulp fraction and the other an insoluble solids-enhanced pulp fraction, each potentially having a wide range of insoluble solids content and consistency.

When characterizing the fluid flow property of tomato products, the term consistency generally is preferred. Consistency actually refers to the apparent viscosity of the tomato product and is influenced to a large degree by both the quantity and character (structure) of insoluble tomato solids in the product. For characterizing the consistency of both the reduced insoluble solids pulp fraction and the insoluble solids-enhanced pulp fraction produced according to this invention it is convenient to use the FMC consistometer available from Brabender CW Instruments Inc. The FMC consistometer is similar in design and operation to the Brookfield consistometer, described for example in *Chemical Engineers' Handbook,* 4th Ed. 1963, p. 22–39, except that a single sized paddle is used for all measurements.

While the consistency of the original tomato macerate is somewhat dependent upon its preparation procedure, its FMC consistency generally will be about 20. Typically, therefore, the reduced insoluble solids pulp fraction will have an FMC consistency below about 20; while the insoluble solids-enhanced pulp fraction will have an FMC consistency above about 20.

Generally, the reduced insoluble solids pulp fraction will have an FMC consistency in the range of about 2–20, and normally the consistency will be in the range of about 2 to about 10 (consistencies in the range of 15–20 are possible using high hot-break macerate). The insoluble solids-enhanced pulp fraction generally will have an FMC consistency in the range of about 20-80 and normally the consistency will be above about 30.

As will be recognized by one skilled in this art, the macerating (break) conditions, e.g., break temperature, will influence the consistency of the original macerate and accordingly will influence the consistencies of the separated fractions. Generally higher break temperatures yield higher consistencies for both fractions. Additionally, in accordance with the present invention, the consistencies of the separated fractions are varied by controlling the degree of separation.

Suitable FMC consistencies for the separated fractions most useful in making specific tomato products such as juice, soup, sauces, paste, etc., can be identified by routine experimentation.

The separation of a tomato macerate into a reduced insoluble solids pulp fraction and an insoluble solids enhanced pulp fraction is not itself new. In a prior art procedure for preparing tomato paste (Szabo U.S. Pat. No. 3,864,504), a tomato macerate previously treated with a calcium salt is subjected to mechanical separation, for example, high-speed centrifugal separation, and a serum fraction is recovered separately from an insoluble solids-enhanced fraction. The recovered serum fraction then is concentrated by vacuum evaporation. Afterwards, the so-concentrated serum is reconstituted with the insoluble solids-enhanced fraction, previously recovered from the centrifugation step, and is chemically treated with phosphoric or citric acid to yield a tomato paste.

This prior art procedure differs from the present invention in two important respects. In the first place, the mechanical separation step, i.e., the high-speed centrifugal separation, used by the prior art was designed to achieve and did achieve a complete separation of the serum fraction of the macerate from the cellular and structural components typically referred to as the insoluble solids fraction. The present invention, on the other hand, is designed to achieve only a partial separation. Furthermore, in one embodiment of the present invention, the degree of separation is controlled (adjusted) by controlling the effective filter area of the separator screen.

Secondly, the mechanical separation procedure of the prior art, i.e., high speed centrifugal separation, unavoidably degrades the cellular structure of the tomato macerate, causing fragmentation of cellular and fibrous structural material. This degradation unavoidably impairs the ultimate consistency obtained in subsequently prepared tomato products. By relying primarily on gravity to perform the separation of the reduced insoluble solids pulp fraction from the insoluble solids-enhanced pulp fraction, the present invention substantially avoids such cellular degradation.

Notably, applicant has discovered that other separation techniques such as vacuum augmented screening, vibratory screening and filter pressing are also unsatisfactory for performing the desired separation of a reduced insoluble solids pulp fraction from an insoluble solids-enhanced pulp fraction. In other words, applicant has determined that a gravity screening produces separate fractions having sufficiently less mechanical damage and exhibiting significantly better quality in subsequently prepared products than other available separation techniques.

As noted, the reduced insoluble solids pulp fraction is separated from the insoluble solids-enhanced pulp fraction of a tomato macerate by passing the macerate over a gravity screen filter. In one embodiment the screen has a controllable (adjustable), effective filter area so that the degree of separation can be controlled as desired. An appropriately modified commercially available rotating drum screen device can be used for this purpose. Suitable rotary drum screen devices are available from Hycor, Inc., and Serck-Baker. These units are used commercially for removing particulate matter from various waste water streams. As far as applicant is aware, these units have never been used to obtain a partial separation of liquid/solids mixture as disclosed and claimed.

FIG. 1 illustrates how a suitable rotary drum unit may be modified for use in the present invention. As illustrated, an adjustable obstruction means is installed in a manner which enables one to control (adjust) the effective screening area exposed to the tomato macerate passing over the screen. By circumferentially varying the position of the obstruction means with respect to the active filter area, the effective filter area is changed. This change in effective filter area causes a change in the degree of separation achieved between the reduced insoluble solids pulp fraction and the insoluble solids-enhanced pulp fraction of a tomato macerate.

Referring specifically to FIG. 1, the rotary drum unit 100 consists of a screen cylinder or drum 10, headbox 20, support frame 30, doctor blade assembly 40, bottom collection trough 50 and a variable speed drive (not shown). The screen cylinder, support frame, doctor blade and bottom collection trough are all of essentially conventional design and require no detailed description.

In terms of the present invention, the important feature of the FIG. 1 arrangement is the design and operation of the headbox 20. In commercially available rotary drum filters, the headbox 20 is attached rigidly to the support frame 30 such that its position with respect to the screen cylinder 10 is fixed. In the FIG. 1 embodiment of this invention, however, headbox 20 is pivotedly (adjustably) coupled to a support flange 31 by support struts 32 and 33 such that its position with respect to the screen cylinder 10 can be varied over a wide range. One possible position is shown in bold lines, and another possible position (phantom) is outlined in dashed lines (component parts bearing identification numerals followed by lower-case letter a.).

The headbox 20 is appropriately sealed to the screen cylinder 10 and the circumferential positioning of the headbox is facilitated by rollers 21, located at opposite ends of the headbox. These rollers engage tracks 11 similarly located at opposite ends of the screen cylinder 10. Through proper sealing of the headbox 20 to the screen cylinder 10, this arrangement provides an adjustable means for blocking or obstructing any desired portion of the active filter surface of the screen cylinder or drum 10. Consequently, this arrangement permits control over the effective filter area exposed to an insoluble solids-containing liquid, such as a tomato macerate, delivered through the headbox to the cylinder screen.

The position of the support struts 32 and 33, and accordingly, the position of the headbox 20 with respect to screen cylinder 10, is controlled by crank assembly 34. While a manual adjustment means is shown, one skilled in the art will readily recognize that the arrangement can be automated.

By varying the position of the headbox 20 between points A and B, the available filter area to which the influent insoluble solids-containing liquid is exposed can be varied over a wide range.

During operation, an influent stream of an insoluble solids-containing liquid, such as a tomato macerate, is introduced into the headbox 20. This influent stream overflows a sealed weir (not shown) onto the rotating drum screen 10. The flow path for material through the headbox 20 preferably is baffled appropriately to uniformly distribute the liquid across the exposed face of the screen cylinder while avoiding the formation of stagnant areas in the headbox. A reduced insoluble solids liquid fraction passes by gravity through the drum perforations (openings) while an enhanced insoluble solids fraction is retained on the filter surface. In this embodiment the degree of separation is controlled, as desired, by varying the relative position of the headbox 20 with respect to the screen cylinder 10, i.e., by varying the portion of the drum surface blocked or obstructed by the adjustable headbox 20.

The enhanced insoluble solids fraction retained on the screen surface is removed by doctor blade assembly 40; while the insoluble solids reduced fraction (screened flow) passes through the top side of the screen cylinder 10, flows down through the bottom portion of the screen cylinder and is collected in bottom collection trough 50.

In addition to the adjustable headbox arrangement shown in FIG. 1, the desired variation in exposed filter area of the drum surface can alternatively be provided, for example, by an adjustable arcuate mask or baffle. The mask could be secured to appropriately designed tracks or runners located at opposite ends of the cylinder screen, thereby permitting the circumferential position of the mask with respect to the cylinder screen to be adjusted as desired.

This embodiment of the present invention, however, is not limited solely to these particular arrangements for controlling the effective filter area of the screen. Rather, any technique for controllably varying (adjusting) the effective filter area of the screen over which the tomato macerate is passed can be employed. Generally, the effective filter area can be varied using any arrangement in which either the contact time between the macerate and the filter or the open area of the filter is adjustable. For example, partial separation of a tomato macerate as disclosed and claimed may be obtained using a rotary drum screen with little or no obstruction of the filter surface simply by properly varying both the feed rate of the tomato macerate to the screen filter and the rotational speed of the filter drum. The functional relationship among such variables as macerate feed rate, drum rotational speed, screen open area and insoluble solids characteristics of the separated pulp fractions can be obtained by routine experimentation.

The desired partial separation also can be obtained using an internal feed rotary drum-type filter positioned at an angle to the horizontal. In this embodiment, the tomato macerate would be fed into the core of the filter screen at its elevated end and would exit from its lower end. The insoluble solids-enhanced pulp fraction would be recovered from the inner core section of the drum filter while the reduced insoluble solids pulp fraction would be recovered external to the rotary drum screen. In addition to controlling the variables discussed above, the effective filter area of this screen can be controlled also by varying the degree of inclination.

Figure 2:
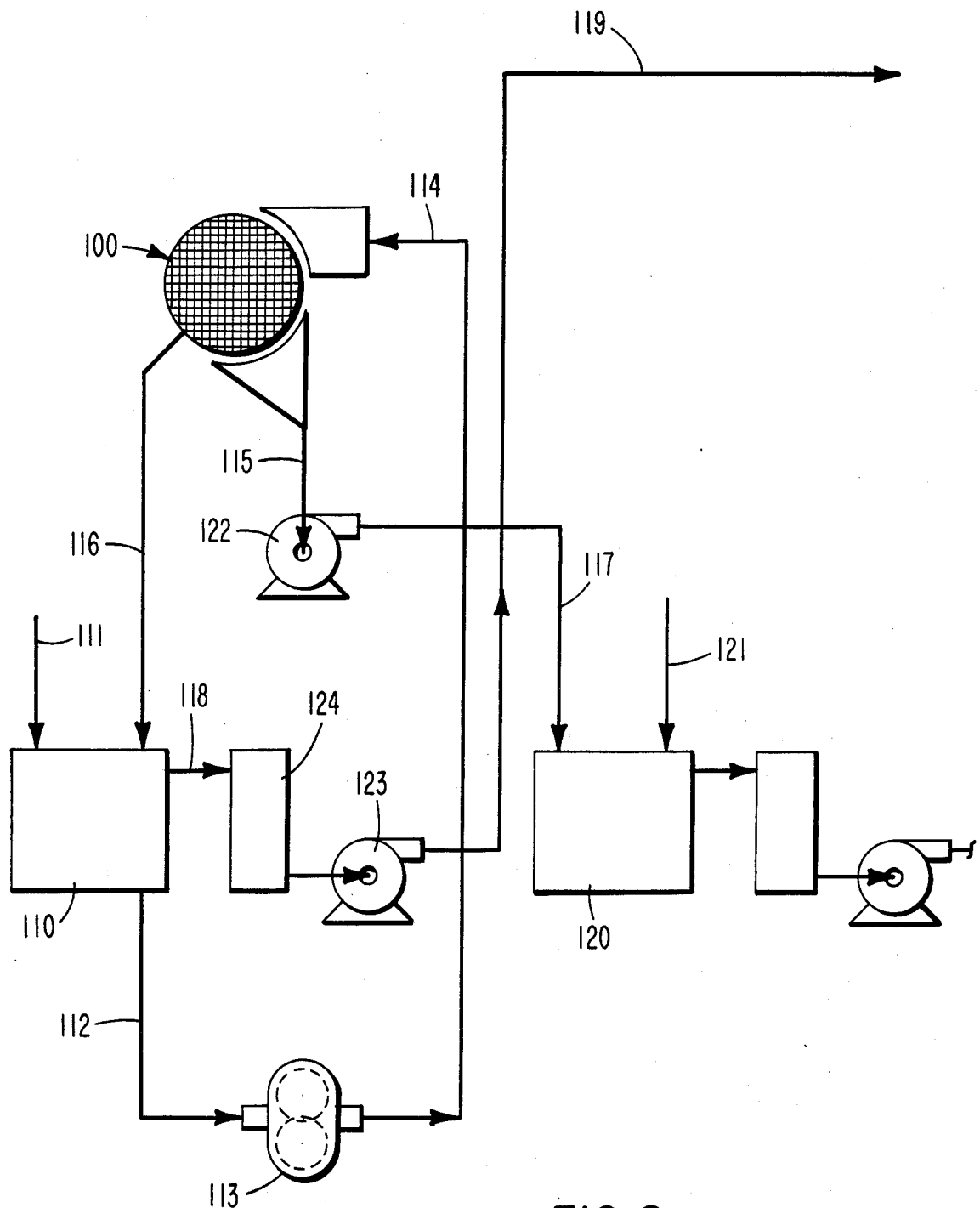
FIG. 2 is a schematic diagram of one embodiment for preparing a concentrated tomato product of controlled consistency using the process of the present invention.

Referring next to FIG. 2, one embodiment will be described which employs the present invention to produce a concentrate tomato product of controlled consistency. This embodiment is useful for preparing such products as tomato soup, tomato sauce and tomato paste.

Hot break tanks 110 and 120 receive fresh tomatoes through lines 111 and 121, respectively. Such tanks typically are provided with steam coils or jackets and a rotating blade assembly for comminuting the tomatoes and agitating the material in the vessel so that good heat transfer is obtained. By using such equipment, the fresh tomatoes are efficiently formed into a hot macerate. A portion of the hot macerate in tank 110 is withdrawn through line 112 and is fed, using screen feed pump 113, through line 114 to the rotating drum screen device 100. The hot macerate fed to the rotary drum filter then is separated into a reduced insoluble solids pulp fraction recovered in line 115 and an insoluble solids-enhanced pulp fraction recovered in line 116. The insoluble solids-enhanced pulp fraction is returned directly to the overflow of the hot break tank 110; while the reduced insoluble solids pulp fraction is transferred to a cold or hot break tank 120 through line 117 by pump 122.

By appropriately controlling the effective filter area of the screen of rotary drum filter 100 as discussed more fully above, the insoluble solids content of both the reduced and enhanced insoluble solids pulp fractions can be regulated as desired.

Rotary drum filter 100 is operated so as to produce a macerate, which is recovered from tank 110 in line 118, that subsequently requires only minimal adjustment, for example by evaporative concentration, in order to produce a high quality tomato product such as soup. The insoluble solids-enhanced macerate recovered in line 118 and surge tank 124 then is conveyed by pump 123 through line 119 to subsequent processing steps.

As the characteristics of the fresh tomatoes change, the present invention provides the flexibility needed to maintain a uniform consistency in the macerate recovered from tank 110 in line 118. For example, as the consistency of the macerate produced directly from the fresh tomatoes tends to increase or decrease, this change can be readily offset simply by increasing or decreasing the degree of insoluble solid enhancement obtained using rotary drum filter 100. As a result, it is possible to maintain the macerate consistency in line 118 relatively uniform.

Furthermore, the reduced insoluble solids pulp fraction recovered in line 115 becomes a useful component in formulating an additional tomato product, such as tomato juice, for example by adding it to the macerate in tank 120. If this material had not been removed from the hot macerate produced in tank 110, not only would more extensive modification of the solids content of the macerate recovered in line 118 have been required in order to produce the desired product, but the water subsequently removed from the hot macerate in order to increase its consistency has essentially no value. The present invention recovers this water in a useful form, i.e., as a reduced insoluble solids pulp fraction, which can be gainfully used, for example, in the manufacture of tomato juice. As shown in FIG. 2, the reduced insoluble solids pulp fraction is introduced into break tank 120 which contains a tomato macerate used, for example, in formulating a tomato juice.

Consequently, the present invention provides a method for maximizing the quantity of tomato products prepared from a fixed amount of fresh tomatoes while simultaneously optimizing the uniformity of at least one of the products produced.

The followiong example is intended to illustrate the nature of the present invention more fully without acting as a limitation on its scope.

EXAMPLE

A hot break tomato macerate, still containing its full complement of seeds, skins and core material, was fed at a rate of 24 gals/min to a Serck-Baker rotary drum filter, Model 125, having 0.01 inch screen openings. The filter unit was modified in accordance with this invention to permit a desired degree of obstruction of the exposed filter area. About 8.5 gals/min of an insoluble solids reduced pulp fraction, having an F.M.C. consistency of about 2 and a total solids content of about 4.8%, was separated from about 15.5 gals/min of an enhanced insoluble solids pulp fraction having an F.M.C. consistency of about 53 and a total solids content of about 5.2%.

While specific aspects of the invention have been described with particularity herein, it will be recognized that various modifications will occur to those skilled in the art. Therefore, the scope of the invention is to be limited solely by the scope of the appended claims.

I claim:

1. A continuous process for partially separating a tomato macerate containing substantially intact tomato pieces, fragmented tomato solids suspended in tomato liquid and unwanted particulate matter into a reduced insoluble solids pulp fraction and an insoluble solids-enhanced pulp fraction comprising:
   (a) passing said tomato macerate over a filter screen to cause a reduced insoluble solids pulp fraction comprised primarily of said tomato liquid to pass through said screen substantially by gravity prior to treating said macerate to remove said unwanted particulate matter;
   (b) retaining the remaining insoluble solids-enhanced pulp fraction of said macerate comprised primarily of said intact tomato pieces on said screen; and
   (c) separately recovering said reduced insoluble solids pulp fraction and said insoluble solids-enhanced pulp fraction.

2. The process of claim 1 wherein the screen has openings ranging from about 0.125 to about 1.50 mm in width.

3. The process of claim 2 wherein the screen has openings ranging from about 0.25 to about 0.51 mm.

4. The process of claim 1 wherein the screen comprises a rotary drum screen.

5. A continuous process for preparing a concentrated tomato product of controlled consistency comprising:
   (a) macerating tomatoes to break up the tomatoes into a pulpy tomato macerate containing substantially intact tomato pieces, fragmented tomato solids suspended in tomato liquid and unwanted particulate matter;
   (b) separating a portion of the pulpy tomato macerate substantially by gravity through a screen into a reduced insoluble solids pulp fraction and an insoluble solids-enhanced pulp fraction comprised primarily of said intact tomato pieces prior to treating said macerate to remove said unwanted particulate matter; and
   (c) blending the insoluble solids-enhanced pulp fraction with the pulpy tomato macerate.

6. The process of claim 5 wherein the pulpy tomato macerate is separated by:
   passing the macerate over a screen having a controllable effective filter area; and
   controlling the effective filter area of said screen to cause a reduced insoluble solids pulp fraction to pass through said screen substantially by gravity and to retain an insoluble solids-enhanced pulp fraction on said screen.

7. The process of claim 6 wherein the screen has openings ranging from about 0.125 to about 1.50 mm in width.

8. The process of claim 7 wherein the screen has openings ranging from about 0.25 to about 0.51 mm.

9. The process of claim 6 wherein the screen comprises a rotary drum screen.

10. A continuous process for the controlled separation of a tomato macerate containing substantially intact tomato pieces, fragmented tomato solids suspended in tomato liquid and unwanted particulate matter into a reduced insoluble solids pulp fraction and an insoluble solids-enhanced pulp fraction comprising:
    (a) passing said tomato macerate over a screen having a controllable effective filter area;
    (b) controlling the effective filter area of said screen to cause a reduced insoluble solids pulp fraction comprised primarily of said tomato liquid to pass through said screen substantially by gravity;
    (c) retaining the remaining insoluble solids-enhanced pulp fraction of said macerate comprised primarily of said intact tomato pieces on said screen;
    (d) separately recovering said reduced insoluble solids pulp fraction and said insoluble solids-enhanced pulp fraction; and
    (e) removing said unwanted particulate matter from said insoluble solids-enhanced pulp fraction recovered in step (d).

11. The process of claim 10 wherein the screen has openings ranging from about 0.125 to about 1.50 mm in width.

12. The process of claim 11 wherein the screen has openings ranging from about 0.25 to about 0.51 mm.

13. The process of claim 10 wherein the screen comprises a rotary drum screen.

14. The process of claim 13 wherein the effective filter area of said screen is controlled by selectively blocking a desired portion of the surface of said screen so as to limit the screen area contacted by said tomato macerate passing over the screen.

15. The process of claim 13 wherein the effective filter area of said screen is controlled by selectively varying the rate said tomato macerate is passed over said screen.

16. The process of claim 13 wherein the effective filter area of said screen is controlled by selectively varying the rate said rotary drum screen is rotated.

* * * * *